Jan. 11, 1966  A. PHILLIPS  3,228,420
GROUND CUSHION AIRCRAFT AND CONTROL SYSTEM
Filed Dec. 14, 1962  9 Sheets-Sheet 1

Inventor
Adrian Phillips
By Cushman, Darby & Cushman
Attorneys

Jan. 11, 1966          A. PHILLIPS          3,228,420
GROUND CUSHION AIRCRAFT AND CONTROL SYSTEM
Filed Dec. 14, 1962                    9 Sheets-Sheet 3

Inventor
Adrian Phillips
By Cushman, Darby & Cushman
Attorneys

Jan. 11, 1966     A. PHILLIPS     3,228,420
GROUND CUSHION AIRCRAFT AND CONTROL SYSTEM
Filed Dec. 14, 1962     9 Sheets-Sheet 5

FORE ⟵⟶ AFT

Inventor
Adrian Phillips
By Cushman, Darby & Cushman
Attorneys

Jan. 11, 1966 A. PHILLIPS 3,228,420
GROUND CUSHION AIRCRAFT AND CONTROL SYSTEM
Filed Dec. 14, 1962 9 Sheets-Sheet 6

FORE ← → AFT

Inventor
Adrian Phillips
By Cushman, Darby & Cushman
Attorneys

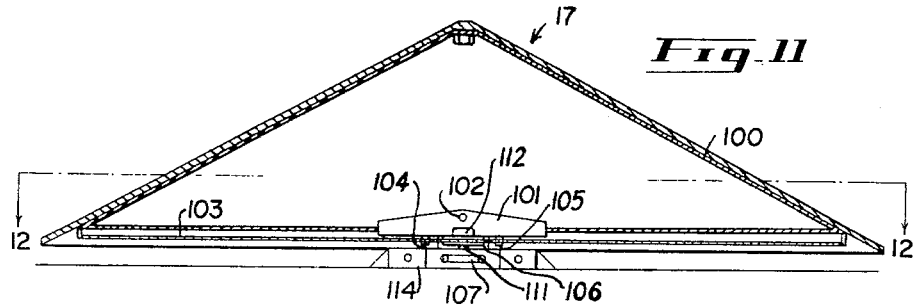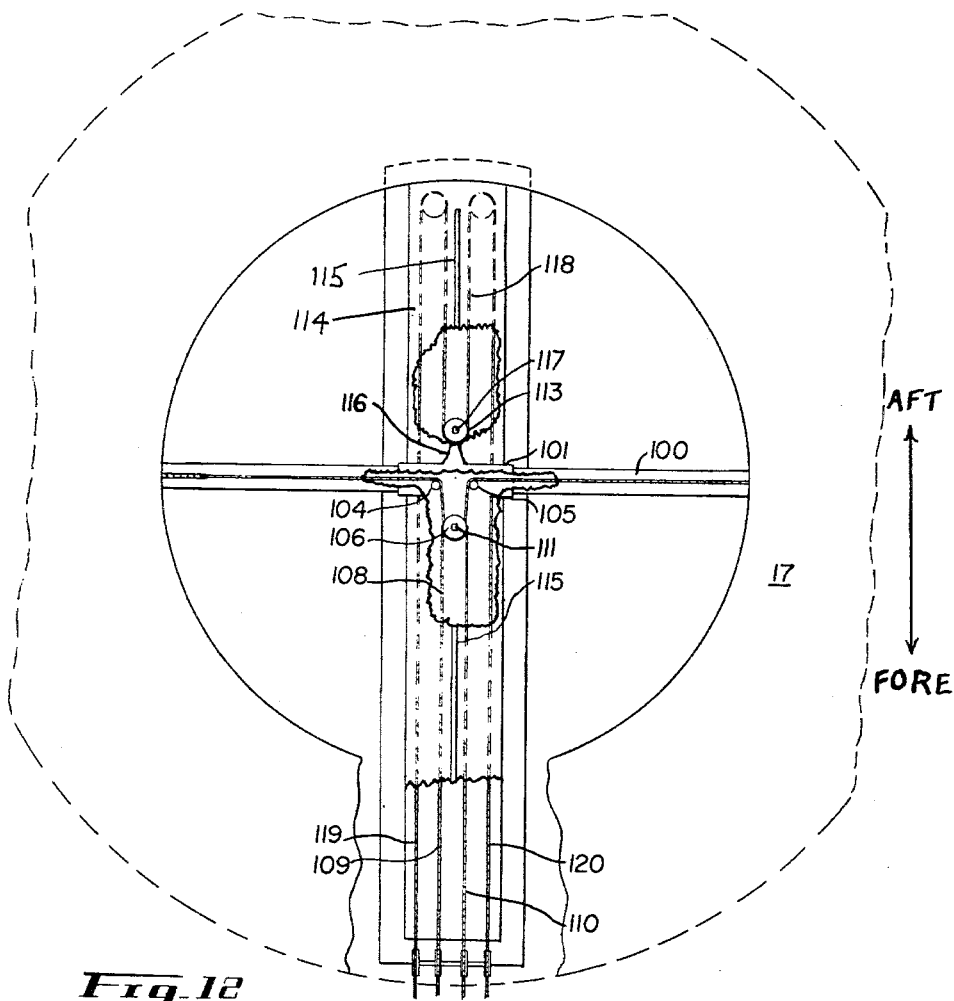

United States Patent Office 3,228,420
Patented Jan. 11, 1966

3,228,420
GROUND CUSHION AIRCRAFT AND
CONTROL SYSTEM
Adrian Phillips, Oakville, Ontario, Canada, assignor to
Aireon Limited, Toronto, Ontario, Canada
Filed Dec. 14, 1962, Ser. No. 244,677
2 Claims. (Cl. 137—610)

This invention relates to an aircraft employing ground cushion effect. It has particular reference also to a vehicle which can take-off from various types of terrain including water, without the necessity of preparing the site beforehand. The aircraft therefore has the advantages of the helicopter in being suited to varying conditions and isolated areas of service. The vehicle is also adapted to undergo free flight above the earth's surface.

It is an object of the present invention to provide an aircraft which employs ground cushion effect to raise the vehicle from the terrain upon which it rests, the vehicle being of such an aerodynamic structure that, upon obtaining translational velocity, lift is provided from the flow of air over its outline, and more particularly to provide a differential control and air deflection mechanism for controlling an aircraft of this type when airborne.

In accordance with the invention there is provided, in a gas flow system wherein gas is caused to flow in a tubular conduit and pass out of the conduit as a radial flow into an annular passage, a valve within the conduit comprising a member movable radially of the conduit to obturate a part of the annular passage and mounting means for the member for moving it independently in two directions at right angles radially of the conduit. The mounting means comprises a supporting bracket for receiving the member for movement in one of said two directions at right angles, positive rotary drive means on the bracket for moving the member relatively to the bracket in one of its two directions at right angles, means mounting the supporting bracket for movement in the second of said two directions at right angles, and cable means for the positive drive means including a pair of ends. The positive drive means is rotatable to move the member in said one direction when the cable is moved longitudinally by movement of its ends in opposite directions, and to move the supporting bracket in said second direction by movement of the ends in the same direction.

A particular embodiment of the invention will now be described having reference to the accompanying drawings, in which:

FIGURE 3 shows a rear view of the vehicle of FIGURE 1;

FIGURE 11 shows a side view in section of the cone assembly; and

FIGURE 12 shows a plan view of FIGURE 11 sectioned along line 12—12.

Figure 1:
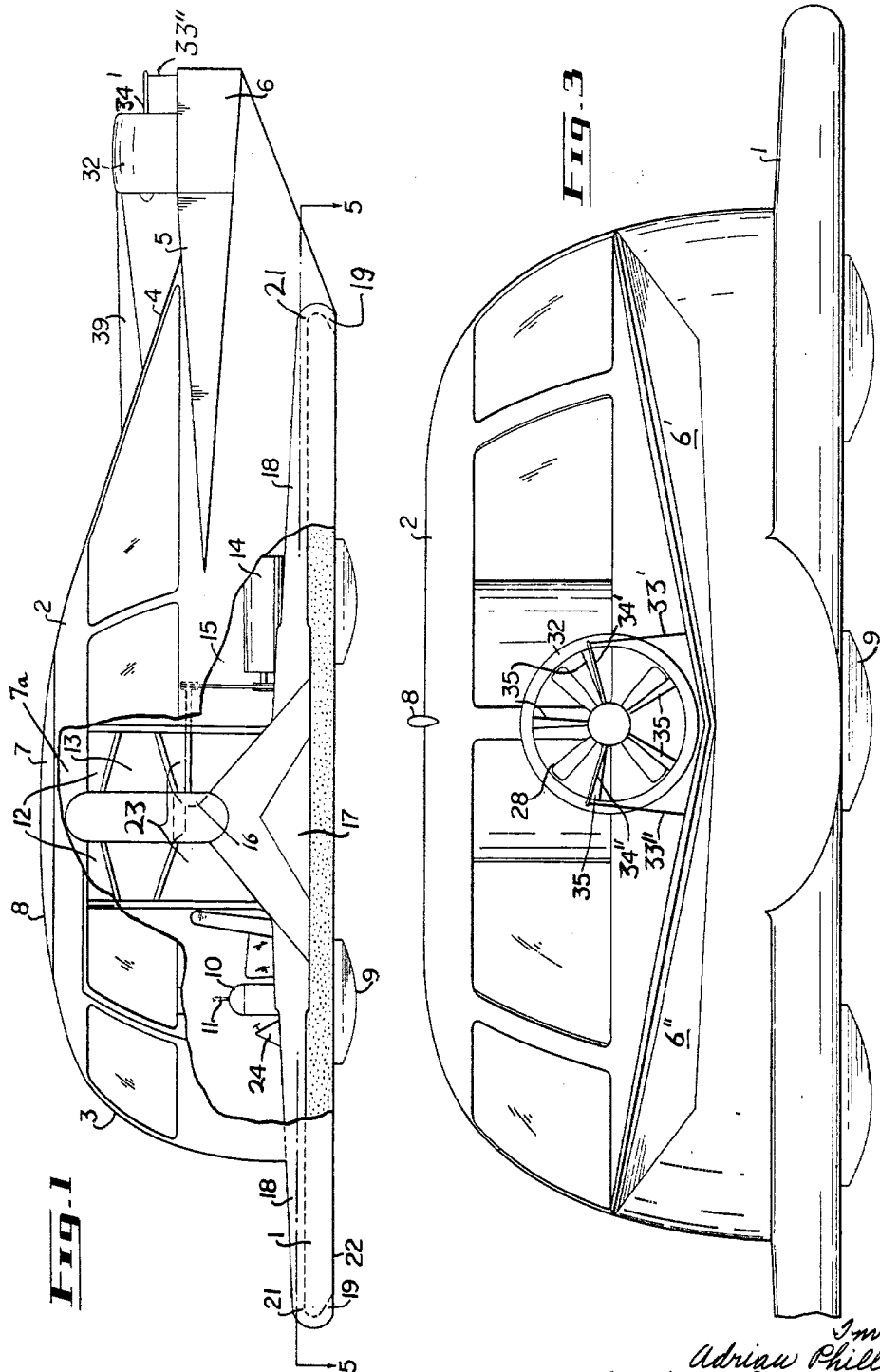
FIGURE 1 shows a side elevation, partly in section, of an aircraft constructed according to the invention.
Figure 2:
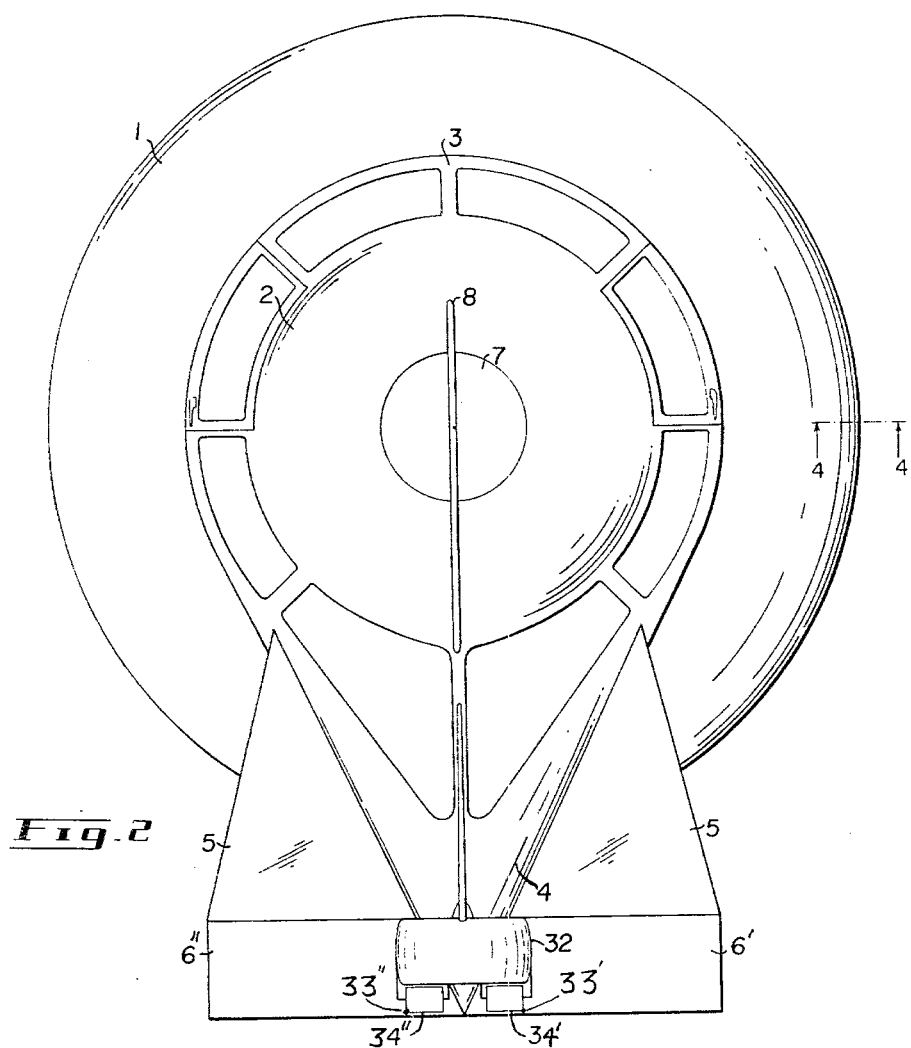
FIGURE 2 shows a plan view of the vehicle of FIGURE 1.

Having reference to FIGURES 1 and 2, the vehicle comprises a disc shaped portion 1, surmounted by a housing 2 whose shape is basically that of a tear-drop having a blunt forward end 3 and an elongated sharper trailing end 4. Wing portions 5 are provided on the trailing edge of the tear-drop section 2, and to the trailing edge of each of these are hinged aerodynamic control members 6. In the prototype the angle of attack of wings 5 was about 5° and the diameter of disc 1 was about 17 feet. The upper portion of housing 2 comprises an air intake duct 7 and an air stream guiding fin 8. Three plastic dome shaped pads 9 secured to the underside of the vehicle provide support for it when on the terrain.

As can be seen from the cutaway portion in FIGURE 1, a control assembly 10 is provided for manipulating control surfaces or elevons 6. If the handle member 11 is moved in a fore and aft direction, the surfaces 6 behave only as elevators, if the handle 11 is moved to port or starboard the control surfaces 6 then act only as ailerons. A combination of motions in the members 10 and 11 produces a combination of motions of control surfaces 6.

In the cutaway section of FIGURE 1, there is shown an axial flow fan 13 preferably having five blades driven by an engine 14. The coupling between these two conveniently includes belt drive 15 and helical gear transmission 16. Air is induced by the fan 13 through the opening 7 into tube 7a, and passes over guides 12 and through stators 23 of which there are preferably eight. The stators remove the swirl velocity of the air introduced by the fan. On leaving the stators the air passes over cone 17 and into tapering annular channel 18. In the prototype the taper of this channel was arranged to give half an inch decrease in section height per foot radius. The height at region 21 was about 2 inches. Tube 7a was about three feet in diameter. The maximum shaft output from the engine 14 available was about 90 H.P. Air finally leaves channel 18 through downwardly and inwardly directed annular ejection orifice 19. The angle of discharge through orifice 19 is arranged to direct air at about 60° with respect to the plane of the underside of the vehicle.

Figure 4:
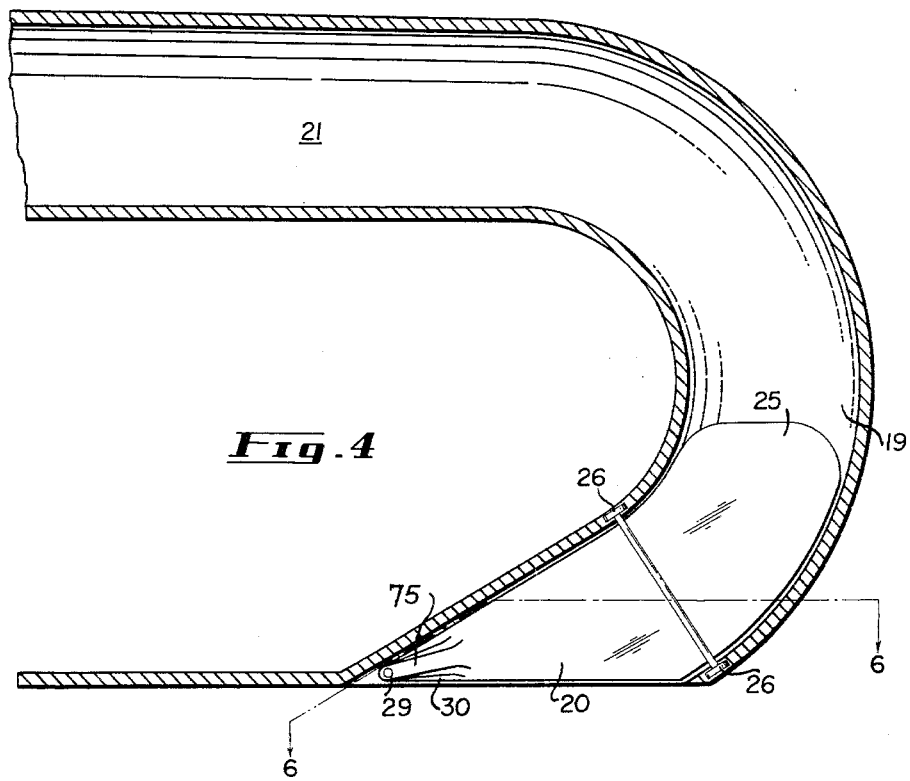
FIGURE 4 shows a section along line 4—4 of FIGURE 2.
Figure 6:
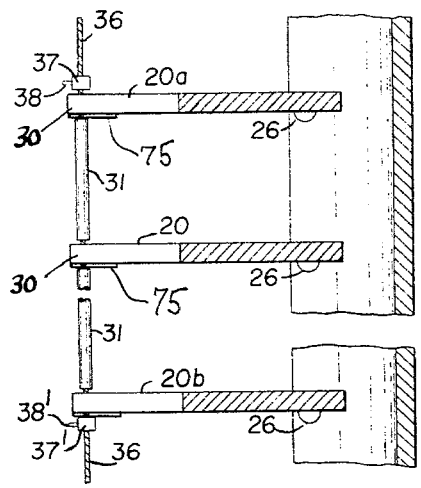
FIGURE 6 shows a section along line 6—6 of FIGURE 4.

The section shown in FIGURE 4 indicates a deflector vane 20 mounted in this orifice 19 for altering the angle of ejected air so that it can locally obtain a forward or a reverse component as seen from the aircraft. The angle through which vanes 20 can be altered is about 40° either side of the vertical. There are several of these vanes on each side of the craft, typically twelve each side being sufficient, having one every six inches along the rim in the prototype. Portions 25 extend upstream of pivot members 26 to balance the vanes in the air stream aerodynamically. The vanes are coupled by suitable cable to a rudder bar 24 so arranged that depression of the bar with the pilot's left foot inclines the vanes 20 on the port side of the craft in a forward direction and the vanes 20 on the starboard side in the aft direction. Movement of the pilot's right foot produces opposite inclinations of the vanes. These vanes 20 thus make possible the applying of yaw forces to rotate the craft about a vertical axis.

Figure 5:
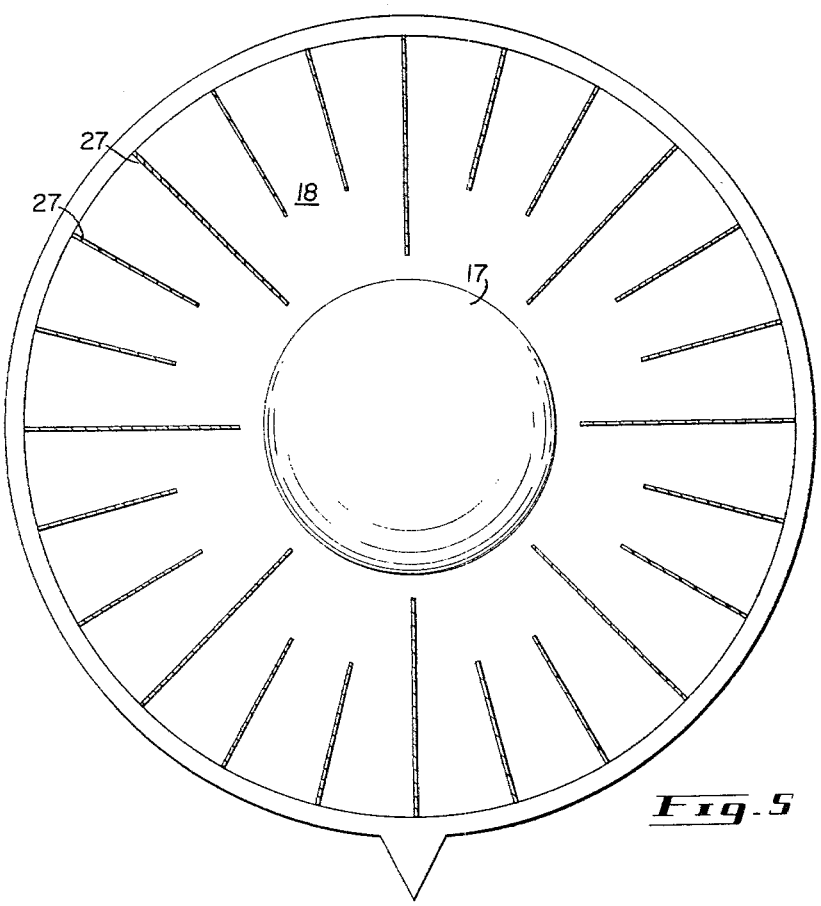
FIGURE 5 shows a section along line 5—5 of FIGURE 1.

The section of FIGURE 5 shows generally the arrangement of cone 17 and of the air stream guides 27 in passage 18. All of these guides may, if desired, be of aerofoil rather than laminar shape as shown here.

The tail portion of the craft carries a ducted fan 28 (FIG. 3) supported to rotate in housing 32 by stator blades 35. To the trailing edge of two of the blades 35 are affixed deflectors 34′ and 34″. The housing 32 is steadied in position by strut 39 (FIG. 1). Control surfaces 34′ and 34″ are moved by their associated elevons 6 by means of link rods 33′ and 33″ connected to the individual elevons.

The cone 17 acts as a valve for the annular passage 18 and is mounted as will be detailed later so that when handle 11 is moved fore and aft or laterally the cone also moves in the same direction as the handle. This cone movement in its approach and recession from the walls of tube 7a and guides 27 alters the proportion of air discharged from the perimeter of orifice 19 by restricting or opening the flow into the tapered passage 18 in a sense so that there is a tilting moment exerted on the craft tending to incline it in the direction of movement of handle 11. The magnitude of the tilting moment varies directly as the magnitude of movement of the handle.

Figure 7:
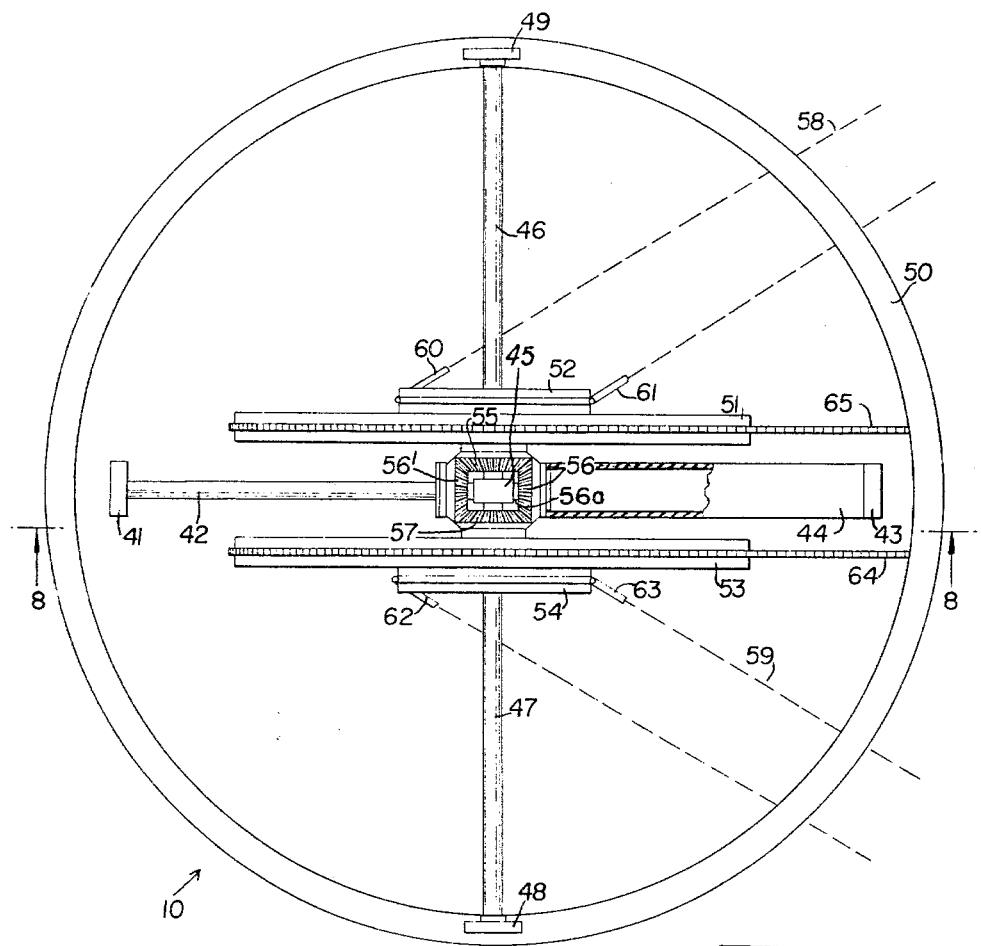
FIGURE 7 shows a plan view of a differential control mechanism for use in the aircraft of the invention.
Figure 8:
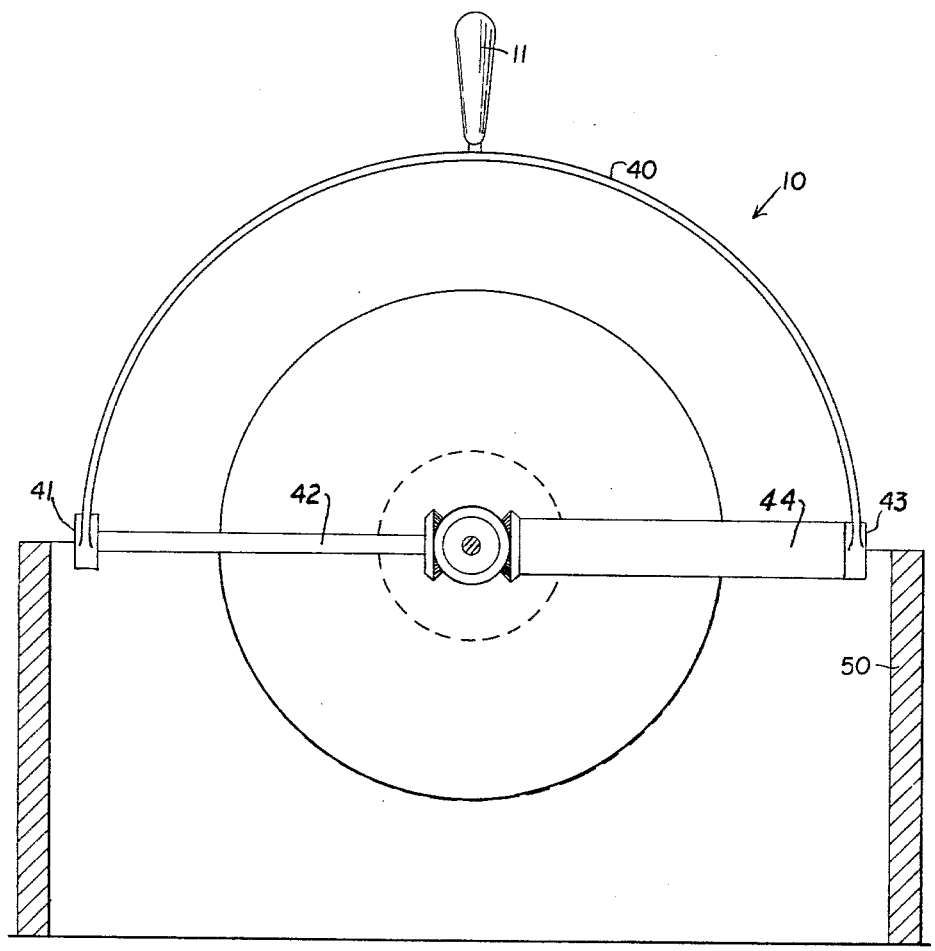
FIGURE 8 shows a side view sectioned along line 8—8 of FIGURE 7.
Figure 9:
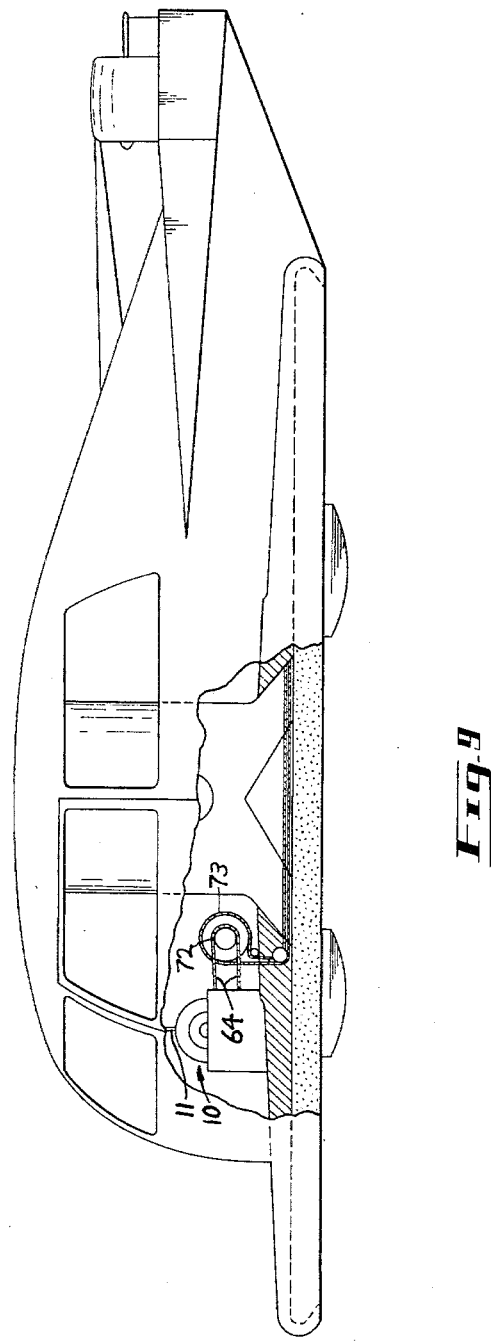
FIGURE 9 shows a side view of the general cone operating mechanism.
Figure 10:
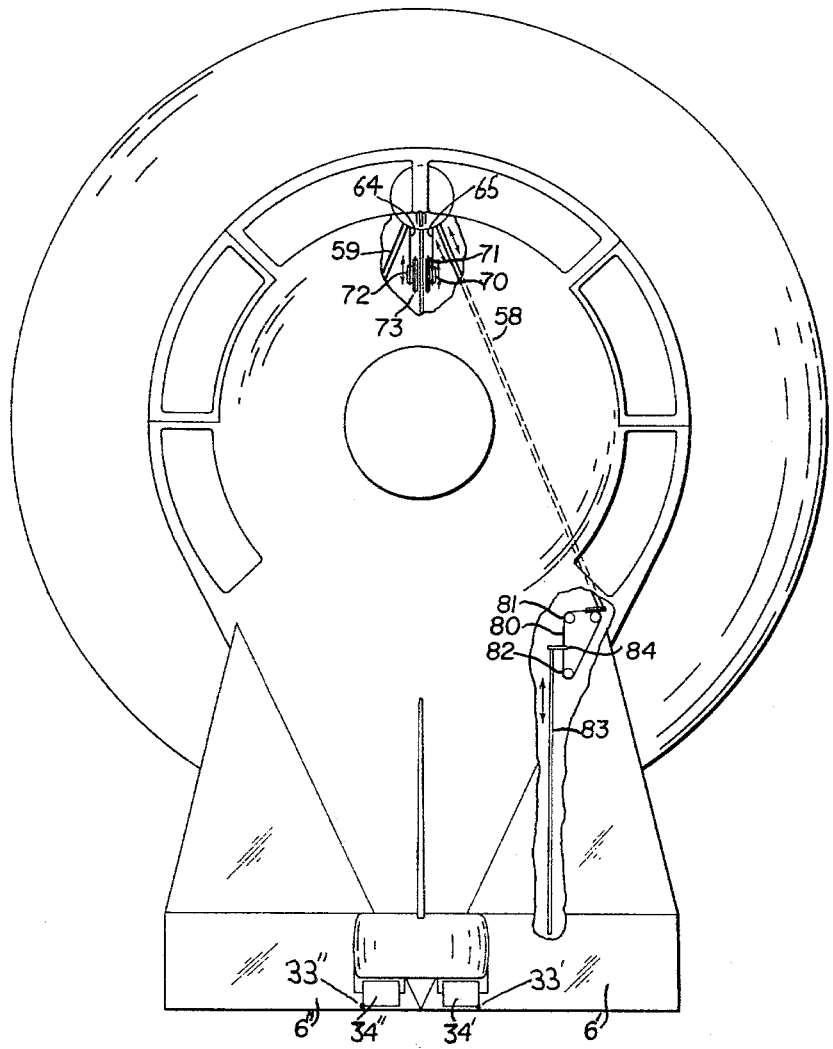
FIGURE 10 shows a partly sectioned plan view of FIGURE 9.

The control for the surfaces 6, fan control surfaces 34 and cone 17 will now be described with reference to FIGURES 7–10. As shown in FIGURES 7 and 8, the control mechanism 10 comprises handle 11 carried on a support 40. Support 40 attaches to a bearing 41 on a shaft 42 and to mount 43 fixed to tubular shaft 44. Two shafts 46 and 47 are carried in bearings 48 and 49 in mounting structure 50 at one end and in bearings in a union 45 at the other. Shaft 46 carries two cable receiving wheels 51 and 52 fixed to the shaft so that they rotate with it. Shaft 47 similarly carries two cable receiving wheels 53 and 54. Shafts 46 and 47 and tube 44, carry bevel gears 55, 57 and 56 respectively which mesh consecutively and which are fixed to their respective shafts and tube for rotation with them. An axial projection 56a on bevel gear 56 is carried rotatably in union 45. Shaft 42 fixed in union 45 also carries a fourth bevel gear 56′ which meshes with gears 55 and 57 as an idler for smoother operation of the differential system. Wheel 52 drives a closed loop cable system 58 for the starboard control surface 6′ and fan deflector 34′. Wheel 54 drives a closed loop cable 59 which moves the port surface 6″ and fan deflector 34″. Cable 58 is led over pulleys 60 and 61, cable 59 over pulleys 62 and 63. Wheels 51 and 53 are coupled by means of cables 64 and 65 to rotate wheels 70 and 72 (see FIGURES 9 and 10) which are directly coupled to wheels 71 and 73 for operation of the cone 11.

The cable 58 has a portion 80 (see FIGURE 10) between two pulleys 81 and 82 located near the rear of the craft to which a control rod 83 linked to starboard surface 6′ is connected at 84. Thus dependent upon the place at which rod 83 is joined to surface 6 with respect to its axis of rotation so the surface is moved up or down as portion 80 of cable 58 moves forwards or rearwards. A similar coupling system is used for port surface 6″. Since the fan deflectors 34′ and 34″ are directly coupled to their respective surfaces 6, they are moved in sympathy with them.

The way in which the control mechanism 10 operates the control surfaces and deflectors is as follows: If handle 11 is moved in the forward direction, wheels 51, 52, 53 and 54 all also rotate so that their upper sides move forwards and through cables 58 and 59 both control surfaces 6 and deflectors 34′ and 34″ are caused to move downwards. This will tend to produce a nose down attitude on the craft when in operation. If handle 11 is moved rearwards, the opposite movements of the surfaces 6, deflectors 34′ and 34″ and cone 17 occur. If handle 11 is moved to the port side, support 43 causes tube 44 to rotate and wheel 56 rotates with it in a counterclockwise direction as viewed from an aft position. Wheels 53 and 54 are thus rotated so that their upper sides move aft, and wheels 51 and 52, so that their upper sides move forward. This action causes the starboard control surface 6 and deflector 34′ to be depressed but raises the port control surface 6 and deflector 34″. Cone control wheels 71 and 73 being directly coupled to wheels 51 and 53 are also rotated in opposite directions. It can now be seen that mechanism 10 causes the control surfaces and deflectors to operate as ailerons when the handle 11 is moved sideways and as elevons when the handle is moved fore and aft. A similar differential movement for wheels 71 and 73 is also produced.

Having reference now to FIGURES 11 and 12 the cone 17 is supported by a metal frame 100 which is free to slide in a supporting bracket 101 within which it is retained by pin 102. A chain 103 connects at its ends to the lower part of frame 100 passes round pulleys 104 and 105 and sprocket 106. Although use of a chain and sprocket is preferred, they might be replaced by other suitable positive drive means, such as a rack joined to frame 100 and a driving pinion in place of the sprocket. The sprocket 106 is coupled by shaft 111 to another pulley 107 which is rotated by a cable 108 having ends 109 and 110. The shaft 111 is carried by a bracket 112 projecting from the support 101. A similar bracket 116 on the opposite side of support 101 carries shaft 117 on which is mounted an idler wheel 113. The wheel 113 and the pulley 107 are accommodated inside a box girder 114 which has a longitudinal slot 115. Support 101 is held attached to the box girder 114 by virtue of the shafts 111 and 117 which project through slot 115 but is free to slide in the direction of the slot. Wheel 113 receives a cable 118 passing round it, comprising ends 119 and 120.

Let us now assume that the fore and aft ends of the cone 17 are those shown in FIGURE 12 and that cable 108 passes to, and around, wheel 73 (FIGURES 9 and 10) so that end 109 is tensioned when the top part of wheels 73 and 51 and when handle 11 move forward. End 110 is connected to wheel 71 so that it is tensioned when the top part of wheels 71 and 53 and when handle 11 move forward. Cable ends 119 and 120 are each connected onto one of wheels 71 and 73 so that these ends become tensioned when the undersides of wheels 51 and 53 move forward and handle 11 is moved aft. The purpose of the connection through wheels 71, 70 and 73, 72 is to increase the velocity ratio step-up from handle 11 to cone 17 and the particular sizes of the wheels will be determined by the dimensions of mechanism 10 and movement of cone 17 required.

It can thus be seen that when handle 11 is moved forwards, as well as the movements produced in surfaces 6 and deflectors 34, the cone 17 is shifted forwards by the equal tightening of ends 109, 110 and the slackening of ends 119 and 120. If handle 11 is moved to port the top of wheel 53 rotates aft and the top of wheel 51 forwards. This movement tightens end 109 and one of ends 119 and 120 slackens end 110 and the other of ends 119 and 120. This movement rotates pulley 107 and sprocket 106 so that chain 103 moves the cone to port. Aft and starboard movements of handle 11 produce corresponding shifts of cone 17. It may be noted that if sufficient slip-free coupling between pulley 107 and cable 108 is difficult to obtain a sprocket may replace pulley 107 and a chain cable 108.

I claim:
1. A control mechanism for a gas flow system wherein gas is caused to flow in a tubular conduit and to pass out of said conduit as a radial flow into an annular passage, comprising a valve within said conduit, said valve comprising a member movable radially of said conduit to obturate a part of said annular passage, and mounting means for said member for moving said member independently in two directions at right angles radially of said conduit, said mounting means comprising, a mounting bracket for receiving said member for movement in one of said two directions at right angles, positive rotary drive means on said bracket for moving said member relatively to said bracket in one of its two directions at right angles, means mounting said bracket for movement in the second of said two directions at right angles, and cable means for said positive rotary drive means including a pair of ends, said rotary drive means being rotatable to move said member in said one direction when said cable is moved longitudinally by movement of said ends in opposite directions and for moving said bracket in said second direction by movement of said ends in the same direction, independent wheels for attaching to each said cable end, a shaft for carrying each said wheel, said shafts being co-linear and mounted for rotation independently of one another whereby movement of each said wheels in a given rotation sense for that wheel moves said cable ends in the same relative direction, and movement of said wheels in relatively opposite senses moves said cable ends in opposite directions, a gear on each said shaft at its end adjacent the other shaft, a further shaft at right angles to the first shafts, a gear on said further shaft fixed to and mounted to rotate with said further shaft about its longitudinal axis and placed to engage both of the first mentioned gears, said further shaft also being mounted to rotate transversely to its longitudinal axis about the point of intersection of the longitudinal axes of said first two shafts and the longitudinal axis of the further shaft, a handle for said further shaft for rotating it independently about its longitudinal axis and transversely to its longitudinal axis whereby each said wheels are rotated in opposite directions when said handle rotates said further shaft about its longitudinal axis whereby said member is moved in the one of its two directions at right angles and whereby each said two wheels are rotated in the same direction when said handle rotates the further shaft transversely to its longitudinal axis and said member is moved in the second of its two directions.

2. In a gas flow system wherein gas is caused to flow in a tubular conduit and to pass out of said conduit as a radial flow into an annular passage, a valve within said conduit comprising a member movable radially of said conduit to obturate a part of said annular passage and mounting means for said member for moving said member independently in two directions at right angles radially of said conduit, said mounting means comprising, a supporting bracket for receiving said member for movement in one of said two directions at right angles, positive rotary drive means on said bracket for moving said member relatively to said bracket in one of its two directions at right angles, means mounting said supporting bracket for movement in the second of said two directions at right angles, and cable means for said positive drive means including a pair of ends, said positive drive means being rotatable to move said member in said one direction when said cable is moved longitudinally by movement of said ends in opposite directions, and for moving said supporting bracket in said second direction by movement of said ends in the same direction.

References Cited by the Examiner
UNITED STATES PATENTS

| | | | |
|---|---|---|---|
| 1,104,542 | 7/1914 | Porter | 244—23 |
| 1,363,794 | 12/1920 | Kirkham et al. | 74—471 |
| 1,559,806 | 11/1925 | Swift | 74—471 |
| 1,754,729 | 4/1930 | Traver | 137—610 |
| 1,767,658 | 6/1930 | Fantz | 137—610 |
| 2,567,392 | 9/1951 | Naught | 244—23 |

M. CARY NELSON, *Primary Examiner.*

MILTON BUCHLER, LAVERNE D. GEIGER,
*Examiners.*